United States Patent Office 2,992,210
Patented July 11, 1961

2,992,210
PROCESS FOR THE PREPARATION OF POLYMERS CONTAINING MERCAPTO GROUPINGS
Muriel S. Gluckman, Pittsburgh, Pa., assignor to Rohm & Haas Company, Philadelphia, Pa., a corporation of Delaware
No Drawing. Filed July 9, 1958, Ser. No. 747,344
4 Claims. (Cl. 260—79.7)

The present invention relates to a new improved process for the preparation of polymers containing pendant mercapto groupings.

A further object is to provide a new and improved process for the production of substantially linear high molecular weight polymers containing a predetermined and controllable number of pendant mercapto groupings in the molecule chain.

A further object of this invention is a process for the preparation of substantially linear high molecular weight reactive polymers containing a predetermined and controllable number of pendant mercapto groupings in the polymer chain, said reactive polymers being capable of reacting with vinyl and vinylidene monomers as hereinafter set forth, said pendant mercapto groupings functioning as chain transfer sites.

A further object of this invention is the preparation of reactive polymers containing a predetermined and controllable number of pendant mercapto groupings, said pendant mercapto groupings being capable of reacting with one another under oxidative conditions to form cross-linked polymers substantially less soluble and less fusible than the initial reacting polymer, the degree of insolubility and infusibility being controllable by the number of reactive pendant mercapto groupings originally incorporated in the initial reacting polymer.

Polymers with pendant free mercapto groupings are known in the prior art, for instance polythiostyrene, the preparation of which is described by Gregor et al, J. Am. Chem. Soc. 77, 3675 (1955) and also by Overberger et al., ibid., 78, 4792 (1956). Processes disclosed in the prior art are multistep processes involving complicated steps with resultant low overall yields. One process, for example, involves nitration of the polystyrene, reduction of the nitrated product to the amine, diazotization of the resulting amine groups, treatment of the diazonium salt with potassium ethylxanthate, and hydrolysis of the resulting xanthate to form the polythiostyrene.

There is also reference in the prior art to polyvinylthiol, this polymer being prepared by polymerizing vinyl thiolacetate, and subsequent hydrolysis of the polymer to polyvinylthiol. Monomer preparation is difficult and the monomer can be copolymerized successfully only with a limited number of other monomers.

A process for the preparation of sulfur-containing resinous products by reacting polyepoxides with mercapto compounds is also disclosed in U.S. Patent 2,831,-830. Under the reaction conditions disclosed, however, the products contain free hydroxyl groups formed by the opening of the epoxide groups.

It has now been surprisingly found that the desired mercapto grouping-containing polymers can be readily prepared in good yields by reacting epoxide grouping-containing polymers with compounds containing mercapto and carboxylic groups under the anaerobic reaction conditions set forth hereinafter. This is the more surprising since it is well-known in the art that both marcapto and carboxylic groupings can react with epoxide groupings since each contain active hydrogen atoms. Under the conditions of the present process, however, the reaction of the mercapto grouping with the epoxide grouping is negligible, the following formula showing the postulated reaction:

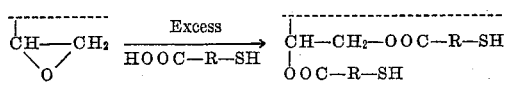

it being understood that the dotted line represents a portion of the polymer chain showing only one isolated epoxide grouping. Thus, under the specific conditions of the present invention, two moles of the mercapto compound react with each mole of epoxide grouping and substantially no hydroxyl groups are formed. The absence of hydroxyl groups is particularly important when the polymer of the present invention is to be used as the polymer backbone for the preparation of graft copolymers as hereinafter set forth.

In the preferred embodiment of this invention, the epoxide grouping occurs at regular intervals as hereinafter described.

The epoxide grouping-containing polymers are prepared by the polymerization of vinylidene including vinyl monoepoxide grouping-containing monomers, with or without the addition of copolymerizable vinylidene including vinyl monomers, or mixtures thereof, free from epoxide groupings and free from active hydrogen groupings. The term "active hydrogen groupings" as used herein refers to hydrogen groupings which react in the Zerewitinoff test. Included in the epoxide grouping-containing monomers are glycidyl acrylate, glycidyl methacrylate, 4,5-epoxypentyl methacrylate and 2-(vinylthio)ethyl glycidyl ether. The preferred epoxide grouping-containing monomers are the glycidyl esters.

Included in the monomers free from epoxide groupings and free from active hydrogen groupings which can be copolymerized with epoxide grouping-containing monomers are methyl acrylate, ethyl acrylate, methyl methacrylate, ethyl methacrylate, ethyl ethacrylate, styrene, methylstyrene, vinyltoluene, vinylnaphthalene and similar unsaturated monomers. Mixtures of these monomers may also be used with the epoxide grouping-containing monomers.

The number of epoxide groupings in the polymer chain, and, hence, the reactivity of the final mercapto grouping-containing polymer, can be readily controlled by varying the ratio in the reaction mixture of the monomers hereinbefore described. Thus, a homopolymer of an epoxide grouping-containing monomer will, on reaction with mercapto acids, yield a highly reactive polymer. Conversely, if a copolymer or heteropolymer containing a high proportion of a vinyl or vinylidene monomer free from epoxide groupings is prepared, a final product of low reactivity will result. The choice of epoxide content depends primarily on the ultimate use of the mercapto grouping-containing polymer so produced by the process of the present invention. If a soluble polymer is desired, a high concentration of epoxide groupings cannot be employed. A preferred range is from about $10^{-4}$ to about $10^{-3}$ moles of epoxide/gram of polymer.

The epoxide grouping-containing monomers or the admixture of said monomers with vinylidene monomers free from epoxide groupings is polymerized employing the anaerobic free radial technique well-known to those skilled in the art. Thus, polymerization with peroxides, azo catalysts, at ambient or elevated temperatures, or exposure to ultraviolet light with or without catalysts are typical of the polymerization conditions which may be employed.

The epoxide grouping-containing polymer so prepared is reacted with a compound containing a mercapto and a carboxyl grouping. While compounds with more than one mercapto grouping and more than one carboxyl grouping can be employed and are within the scope of this invention, the preferred embodiment of this invention employs compounds with only one mercapto and one carboxyl grouping per molecule in order to avoid cross-linking during the reaction of the epoxide grouping-containing polymer with the compound containing the mercapto and carboxyl grouping. Numerous compounds containing mercapto and carboxyl groupings are operable in the present invention including, for example, thioglycollic acid, mercaptopropionic acid, the monomethyl ether of thiomalic and p-mercaptobenzoic acid.

While it is possible to vary widely the ratio of the mercaptoacid and the epoxide grouping-containing polymer in the reaction mixture, the preferred embodiment employs an excess of the mercaptoacid over the theoretical amount required. Such an excess of the mercaptoacid eliminates unwanted side reactions between the mercapto grouping and excess epoxide groupings, maintains an acidic medium throughout the reaction period, and reacts with any oxidizing agent which may be present in the reactants.

The preferred embodiment of this process employs a solvent in which both reactants are soluble. Said solvent must be inert insofar as the reactive groupings of both reactants is concerned, i.e., the epoxide grouping of the reacting polymer and the mercapto and carboxyl groupings of the mercaptoacid. Since the reaction is carried out in the range of from about 60° C. to about 150° C. and preferably in the range of about 80° C. to about 130° C., solvents boiling in these ranges or above are preferred. Such solvents include benzene, toluene, ethyl benzene, chlorobenzene, and xylene.

The polymers containing the pendant mercapto groupings are reactive in the presence of air, cross-linking readily at ambient temperatures if exposed to air. The cross-linked polymers so formed are all infusible and insoluble to some degree, the degree of infusibility and insolubility depending on the number of pendant mercapto groupings per molecule. In those cases in which the polymer containing pendant mercapto groupings is to be reacted with another reactant, it is, therefore, important that air be excluded. The reaction must be carried out under anaerobic conditions by flushing the reaction mixture with nitrogen or by removing all air from the reaction mixture by evacuation. If the polymer containing pendant mercapto groupings is to be stored after preparation, it must be stored in vacuo or under an atmosphere of nitrogen.

The polymer is purified after the reaction is complete by removal of the excess mercaptoacid by such techniques as freeze-drying, heating in vacuo, azeotropic distillation, or preferably by precipitation of the polymer by a non-solvent for it, which non-solvent is a solvent for the mercaptoacid. Such solvents include lower alkanes, such as pentane, hexane, heptane, and alkyl substituted derivatives thereof and lower alkanols such as methanol and ethanol. The solvents employed for precipitation must be freed of oxygen prior to use by flushing with nitrogen or carbon dioxide or by vacuum degassing.

Solutions of the polymers containing pendant mercapto groupings are useful as coatings which become insoluble and infusible by exposure to air. Thus, exposure to air at ambient temperature, i.e. without the necessity of a baking or elevated temperature curing operation, produces films which are insoluble in common solvents and resistant to flow and sagging at elevated temperatures.

The polymers of the present invention can also be cross-linked by the addition of iodine to the polymer solution at room temperature. The water-insoluble polymer so formed is useful as a sequestering agent for metal ions which form mercaptides, such as lead and mercury. In a typical test, the insoluble polymer removed lead ions from a dilute aqueous solution of lead nitrate by contacting the dilute solution with the polymer.

The polymers of the present invention are particularly useful for the preparation of the graft copolymers of controllable configuration which are substantially free from homopolymers. These graft copolymers are prepared by the anaerobic free radical polymerization of the pendant mercapto grouping-containing polymers of the present invention with vinylidene monomers. The preformed pendant mercapto grouping-containing polymers of the present invention are employed as the polymer backbone to which chains consisting of multiple units of the vinylidene monomer are chemically attached. It is postulated that growing new polymer chains readily chain transfer with the active mercapto sites in the polymer backbone to form free radicals on the polymer backbone, which free radicals then initiate growing chains of the new polymer. Because of the high activity of the mercapto groupings as chain transfer sites, graft copolymerization proceeds almost to the complete exclusion of homopolymerization.

These graft copolymers are prepared by dissolving the preformed polymer backbone containing pendant mercapto groupings in the monomer or in a chemically inert solvent, freeing the solution of oxygen by conventional methods and adding a catalyst which provides free radicals such as peroxides or azo compounds of the azobis(isobutyronitrile) type. The reaction is conducted at a temperature of about 0° C. to about 100° C. Temperatures higher than 100° C. are not preferred. The copolymer so formed is isolated by methods well-known to those skilled in the art including in vacuo removal of volatiles, freeze-drying or precipitation with a non-solvent for the polymer.

The copolymers so formed which are free from residual mercapto groupings are useful for coatings, for molding powders and similar uses. If the proportions are chosen so that the graft copolymer contains residual mercapto groupings, then the graft copolymers are cross-linkable at ambient or elevated temperatures by oxidizing agents. Such cross-linkable copolymers are useful for the preparation of coatings which air dry to form films which are solvent resistant and which do not flow or sag at elevated temperatures.

The following examples set forth certain well-defined instances of the application of this invention. They are not, however, to be considered as limitations thereof since many modifications may be made without departing from the spirit and scope of this invention.

Unless otherwise specified, all parts are by weight.

*Example 1*

A copolymer of methyl methacrylate and glycidyl acrylate was prepared in bulk at 80° C. with benzoyl peroxide as initiator, and was found on analysis to contain 0.2 milliequivalents of epoxide/gram of polymer. To 10 parts of this polymer dissolved in 150 parts of chlorobenzene were added 10 parts of redistilled thioglycollic acid. The mixture was thoroughly flushed with nitrogen and kept at 100° C. on the steam bath for 30 hours. The polymer was precipitated by slow addition to 3 liters of cold, nitrogen-flushed hexane. After thorough washing and drying in vacuo at 100° C. for seven hours, the polymer was analyzed and found to contain 0.36 milliequivalent of mercaptan/gram of polymer.

To one part of this polymer dissolved in 50 parts of benzene was added 0.01 part iodine (as a 1% solution in ethanol). The iodine was decolorized immediately, and the polymer became insoluble, but swollen. The benzene was removed by heating in vacuo at 100° C. for several hours. The resulting resin was swollen with benzene; shaking of the resin with a solution of β-mercaptoethanol converted the resin back to the soluble form. The insoluble resin was shown qualitatively to reduce iodine to iodide and to remove lead ion from a dilute aqueous solution of lead nitrate.

Example 2

In a manner similar to the previous example, a copolymer of methyl methacrylate and glycidyl methacrylate was prepared and treated with a thioglycollic acid. The resulting polymer after drying was shown to contain 0.31 milliequivalent of mercaptan groups/gram of polymer and to have a viscosity-average molecular weight of 420,000.

This polymer (4.89 parts) was dissolved in a mixture of 60 parts benzene and 20 parts distilled lauryl methacrylate monomer. Azobis(isobutyronitrile) (0.01 part) was added, the mixture degassed by freezing and thawing under vacuum, and the mixture heated at 60° C. for 20 hours. The solution was turbid and had increased in viscosity; it was poured into cold methanol, washed and dried in vacuo. Of the 17.45 parts of polymer recovered, only traces (less than 0.5 part) of homopolymer of either methyl methacrylate or lauryl methacrylate could be extracted by use of selective solvents. The polymer was still soluble in common solvents; analysis showed 0.21 milliequivalents of free mercaptan groups/gram of polymer remaining. This graft copolymer was cast as a film which was allowed to form under a very slow stream of nitrogen. The resulting soluble film was flexible, unlike a poly(methyl methacrylate) film, but not tacky, as is a film of poly(lauryl methacrylate). Allowing the film to stand in air or gentle heating in the presence of air renders the film insoluble in common solvents, making it somewhat less flexible at room temperature, but allowing it to be more form-stable at higher temperatures.

Example 3

A copolymer of ethyl acrylate and glycidyl methacrylate was prepared in solution from the following mixture:

| | Parts |
|---|---|
| Ethyl acrylate | 247 |
| Glycidyl methacrylate | 2 |
| Butyl mercaptan | 0.1 |
| Benzene | 260 |
| Azobis(isobutyronitrile) | 0.01 |

The mixture was flushed with nitrogen and heated at 60° C. for 24 hours. The viscous mixture was diluted with 200 parts of benzene and precipitated with 6 liters of hexane. After thorough drying, 162 parts of polymer were recovered, having an epoxide content of 0.07 milliequivalent/gram of polymer, and an intrinsic viscosity of 1.49, corresponding to a molecular weight of 770,000.

Seventy-five parts of this polymer were then reacted with 75 parts of thioglycollic acid in 750 parts toluene solution under a nitrogen blanket at 110° C. for 48 hours. The polymer was then precipitated with 9 liters of cold carbon dioxide-flushed heptane. After drying in vacuo, 60 parts were redissolved in 300 parts of benzene and reprecipitated in cold methanol. After again drying in vacuo, the polymer was redissolved in 100 parts benzene and stored under a nitrogen atmosphere. On analysis for mercaptan content, 0.15 milliequivalent/gram of polymer were found.

Example 4

In a manner similar to the above, a copolymer was prepared from butyl acrylate, methyl methacrylate and glycidyl methacrylate. The polymer was reacted with excess thioglycollic acid in benzene for 40 hours at 80° C., and was then stripped of solvent and excess thioglycollic acid in vacuo. The resulting copolymer was redissolved in chloroform, and a film was cast from the chloroform solution on a mercury surface. After evaporation of the chloroform and drying of the film in a current of air at room temperature, the film could not be redissolved in any of the common solvents, although it was swollen by chloroform, acetone, and benzene.

Example 5

A copolymer of styrene and (2-vinylthio)ethyl glycidyl ether was prepared in bulk utilizing the following formulation:

| | Parts |
|---|---|
| Styrene | 204 |
| (2-Vinylthio)ethyl glycidyl ether | 18 |
| Azobis(isobutyronitrile) | 0.3 |

The mixture was thoroughly flushed with nitrogen and heated at 60° C. for 5⅓ hours. The polymer was precipitated with 6 liters of methanol, washed thoroughly and dried. Thirty-four parts of polymer were rehcovered, having an intrinsic viscosity of 0.69, corresponding to a molecular weight of 160,000. The polymer was found to contain 0.10 milliequivalent of epoxide/gram of polymer. This polymer was dissolved in 600 parts of xylene and heated in an oil bath at 120° C. for 20 hours with 30 parts thioglycollic acid. Precipitation by pouring into a large excess of methanol, followed by thorough drying in vacuo of the polymer, gave a mercapto-containing polystyrene analyzing for 0.05 milliequivalent of mercaptan/gram of polymer.

Example 6

A copolymer was prepared from a mixture of 100 parts butyl methacrylate and 1 part 4,5-epoxypentyl methacrylate. It was analyzed and shown to contain 0.18 milliequivalents of epoxide/gram of polymer. The polymer (10 parts) was dissolved in 85 parts of ethylbenzene and heated with 10 parts of β-mercaptopropionic acid under nitrogen for five hours at 130° C. The solution was cooled and the polymer precipitated with 2 liters of cold ethanol flushed with nitrogen. The polymer was dried in vacuo and shown to contain 0.36 milliequivalent of mercaptan/gram of polymer.

Example 7

Employing the operating conditions as set forth in Example 1, polymers were prepared in which each of the monomers set forth hereinafter were substituted for the methyl methacrylate; ethylhexyl acrylate, cyclohexyl acrylate, phenyl acrylate, isobornyl methacrylate and phenyl ethoxyacrylate. In each instance, the reaction followed the same pattern as in the example using methyl methacrylate. Similar experiments were conducted in which one-half the methyl methacrylate was replaced with dimethyl maleate.

I claim:

1. A process for the preparation of substantially linear polymers containing a predetermined and controllable number of pendant vicinal mercapto groups which comprises reacting in a solvent selected from the group consisting of benzene, alkyl-substituted benzene, halogen-substituted benzene, and α-halogen-substituted benzene, in which the alkyl group contains 1 to 4 carbon atoms and the halogen is selected from the group consisting of chlorine and bromine, at a temperature of from about 60° C. to about 150° C., in a nonoxidizing substantially moisture-free atmosphere (1) a copolymer of (a) an epoxide group-containing monomer selected from the group consisting of glycidyl acrylate, glycidyl methacrylate, 4,5-epoxpentyl methacrylate and 2-(vinylthio) ethyl glycidyl ether and mixtures of these monomers with (b) a monomer selected from the group consisting of methyl acrylate, ethyl acrylate, methyl methacrylate, ethyl methacrylate, ethyl ethacrylate, styrene, methylstyrene, vinyltoluene, vinylnaphthalene, and mixtures thereof and (2) at least two equivalents based on the epoxide content of the copolymer of thiocarboxylic acid selected from the group consisting of thioglycollic acid, mercaptopropionic acid, the monomethyl ester of thiomalic acid and p-mercaptobenzoic acid, and isolating the polymer so formed.

2. A process as set forth in claim 1 in which the reaction temperature is from 80° to 130° C.

3. A process as set forth in claim 1 in which the ratio of the mercaptoacid to the epoxide grouping is from about 2.2 moles to about 3.0 moles of mercaptoacid per mole of epoxide grouping.

4. A process as set forth in claim 1 in which said epoxide grouping-containing polymer contains from about $10^{-4}$ moles epoxide to about $10^{-3}$ moles epoxide per gram of polymer.

References Cited in the file of this patent
UNITED STATES PATENTS
2,831,830   Schroeder _____ Apr. 22, 1958